US007843469B2

(12) United States Patent
Aspen

(10) Patent No.: US 7,843,469 B2
(45) Date of Patent: Nov. 30, 2010

(54) OVERLAYING INFORMATION ONTO A VIEW FOR ELECTRONIC DISPLAY

(75) Inventor: Sven Aspen, Sherwood, OR (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 11/490,742

(22) Filed: Jul. 21, 2006

(65) Prior Publication Data

US 2008/0018659 A1    Jan. 24, 2008

(51) Int. Cl.
*G09G 5/02* (2006.01)
*G09G 5/00* (2006.01)

(52) U.S. Cl. ...................................... 345/629; 345/592
(58) Field of Classification Search ................. 725/592, 725/634
See application file for complete search history.

(56) References Cited

U.S. PATENT DOCUMENTS

| 5,265,024 | A  | * | 11/1993 | Crabill et al. | ............... 701/200 |
| 6,177,945 | B1 | * | 1/2001  | Pleyer         | ............... 345/473 |
| 6,227,491 | B1 |   | 5/2001  | Stephan et al. |                        |
| 6,384,840 | B1 | * | 5/2002  | Frank et al.   | ............... 345/634 |
| 6,501,392 | B2 |   | 12/2002 | Gremmert       |                        |
| 6,694,486 | B2 | * | 2/2004  | Frank et al.   | ............... 715/203 |
| 6,786,453 | B2 |   | 9/2004  | Jones          |                        |
| 6,889,938 | B1 |   | 5/2005  | Nordman        |                        |
| 7,019,757 | B2 | * | 3/2006  | Brown et al.   | ............... 345/592 |
| 7,028,950 | B2 |   | 4/2006  | Salmon et al.  |                        |
| 7,046,254 | B2 | * | 5/2006  | Brown et al.   | ............... 345/592 |
| 7,176,937 | B2 | * | 2/2007  | Gannon         | ............... 345/592 |
| 2001/0056443 | A1 | * | 12/2001 | Takayama et al. | ........... 707/513 |
| 2002/0149599 | A1 | * | 10/2002 | Dwyer et al.   | ............... 345/592 |
| 2002/0171682 | A1 | * | 11/2002 | Frank et al.   | ............... 345/790 |
| 2003/0156046 | A1 | * | 8/2003  | Dwyer et al.   | ............... 340/973 |
| 2003/0210228 | A1 | * | 11/2003 | Ebersole et al. | ............. 345/157 |
| 2004/0189656 | A1 |   | 9/2004  | Moore          |                        |
| 2004/0233216 | A1 | * | 11/2004 | Rekimoto et al. | ........... 345/592 |
| 2005/0288831 | A1 |   | 12/2005 | Lusardi et al. |                        |
| 2006/0265126 | A1 | * | 11/2006 | Olcott         | ............... 701/211 |

FOREIGN PATENT DOCUMENTS

| EP | 0926652 A1 | 6/1999 |
| EP | 1571536    | 9/2005 |
| WO | WO 98/10311 | 3/1998 |

OTHER PUBLICATIONS

European Patent Office Action dated Jun. 14, 2010 for corresponding Application No. 07 013 928.2-1236, 5 pages.

* cited by examiner

*Primary Examiner*—Kee M Tung
*Assistant Examiner*—Carlos Perromat
(74) *Attorney, Agent, or Firm*—Harness, Dickey & Pierce, P.L.C.

(57) ABSTRACT

A method of overlaying information onto a view for electronic display. A scale of the view is determined. A significance of the overlay information is also determined. A display transparency of the overlay information is selected based on the determined scale and the determined significance. This method makes it possible for a pilot to view weather imagery overlaid on an electronically displayed map without having to switch back and forth between overlay and underlying map to see detail information when zooming in or out of the map.

20 Claims, 5 Drawing Sheets

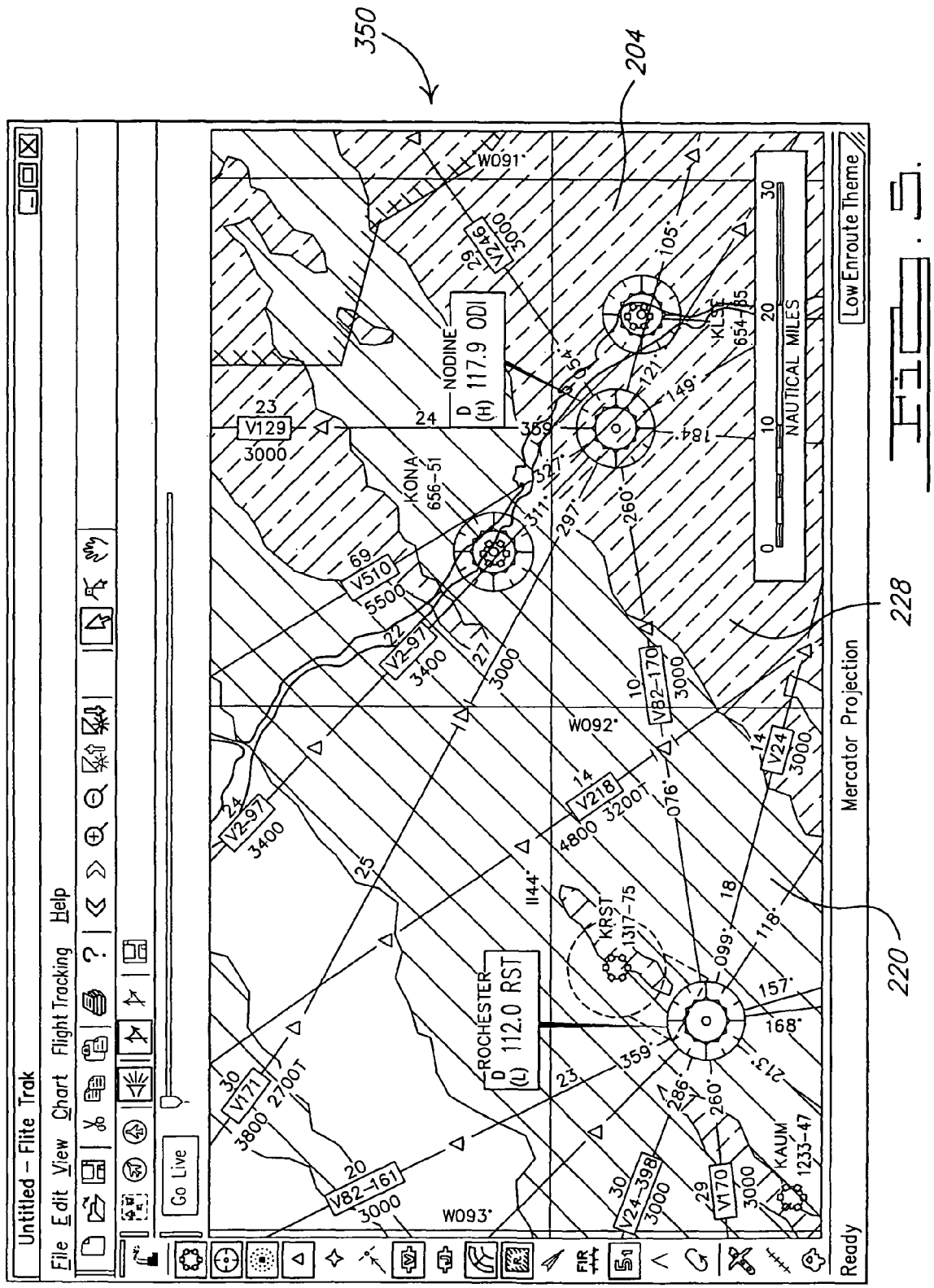
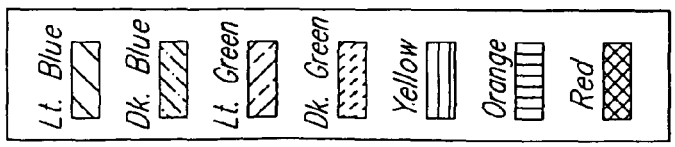
FIG. 5

OVERLAYING INFORMATION ONTO A VIEW FOR ELECTRONIC DISPLAY

CROSS-REFERENCE TO RELATED APPLICATIONS

This application is related to U.S. patent application Ser. No. 11/490,741, entitled "Selecting and Identifying View Overlay Information For Electronic Display", filed on the same date as this application. The disclosure of the above application is incorporated herein by reference.

FIELD

The present disclosure relates generally to electronically displaying information and more particularly to clarifying the depiction of electronically displayed information.

BACKGROUND

The statements in this section merely provide background information related to the present disclosure and may not constitute prior art.

Electronic displays are available in aircraft whereby pilots can view aeronautical charts and weather information during flight. Because pilots frequently need to make informed weather-related decisions quickly, it is highly desirable to depict weather information on an aeronautical chart without obscuring aeronautical information also displayed on the chart.

SUMMARY

The present disclosure, in one implementation, is directed to a method of overlaying information onto a view for electronic display. A scale of the view is determined. A significance of the overlay information is also determined. A display transparency of the overlay information is selected based on the determined scale and the determined significance.

In another implementation, the disclosure is directed to a processor-implemented method of facilitating user interaction with a display on which information is displayable in one or more views and overlay information is overlayable on the one or more views. The method includes determining a scale of a current view, determining a significance of at least part of the overlay information, and updating a display transparency of the overlay information based on the determined scale and the determined significance.

In yet another implementation, the disclosure is directed to a system for electronically displaying overlay information relative to chart data. The system includes a processor and memory configured to display the chart data as a view and determine a scale of the view. The processor and memory are also configured to determine a significance of at least part of the overlay information, select a display transparency based on the determined scale and the determined significance, and display the at least part of the overlay information over the view at the selected display transparency.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 3-6 are screen shots of views of an aeronautical chart with overlay information in accordance with one implementation of the disclosure.

DETAILED DESCRIPTION OF THE PREFERRED EMBODIMENTS

The following description is merely exemplary in nature and is not intended to limit the present disclosure, application, or uses. The present disclosure, in some implementations, is directed to a method of overlaying information onto a view for electronic display. Although various implementations are discussed with reference to overlaying weather information onto views of aeronautical charts, the disclosure is not so limited. The disclosure could be implemented in connection with various weather-related applications, including but not limited to television broadcasting of weather maps. Additionally or alternatively, the disclosure could be implemented in connection with navigation-related applications not necessarily involving weather-related information. Such applications could involve, for example, information relating to flight-restricted areas, communication restrictions and/or notification requirements relating to geographical areas, etc. Furthermore, the disclosure can be implemented in connection with applications not necessarily relating to weather or to navigation. The disclosure can be implemented in virtually any environment, including but not limited to air, space, maritime, marine and/or terrestrial environments.

Figure 1:
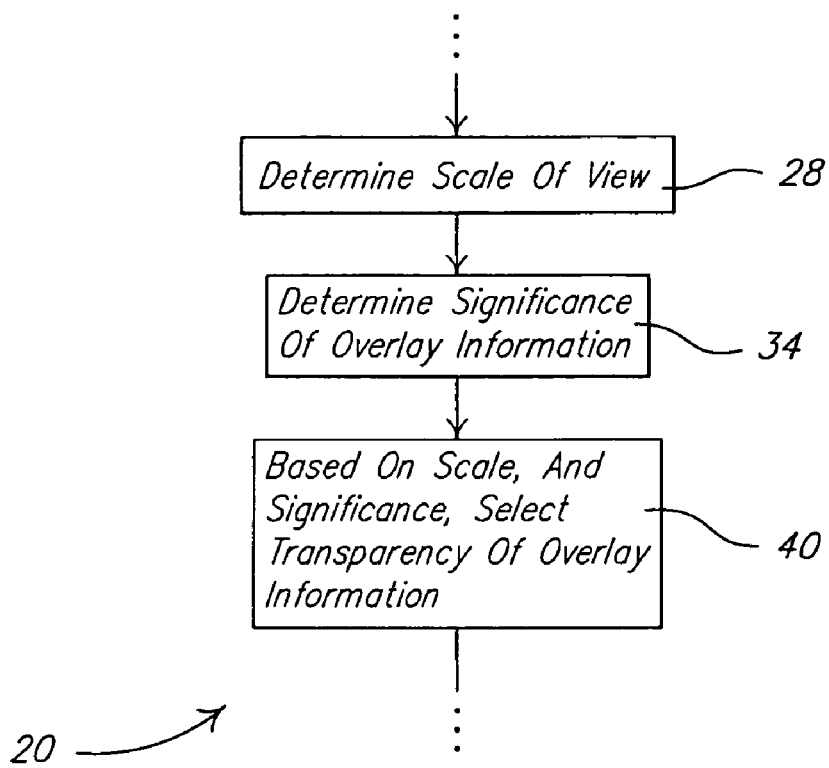
FIG. 1 is a flow diagram of a method of overlaying information onto a view in accordance with one implementation of the disclosure.

A flow diagram of a method of overlaying information onto a view in accordance with one implementation of the disclosure is indicated generally in FIG. 1 by reference number 20. In operation 28, a scale of the view is determined. In operation 34, a significance of the overlay information is determined. In operation 40, a display transparency of the overlay information is selected based on the determined scale and the determined significance. It should be noted that the term "significance" may be used in connection with many different types of overlay information. In an exemplary implementation described below in which radar returns are overlaid into an aeronautical chart view, "significance" represents an intensity level of a radar return. In other implementations, levels of significance could represent, for example, levels of turbulence, icing, flyover-restricted areas, etc. More generally, a significance level or value could be assigned to an item of overlay information to represent, for example, a level of user attention warranted by the item.

One exemplary implementation of the present disclosure is described below with reference to overlay of weather information, specifically radar returns, onto aeronautical charts for display via an electronic flight bag (EFB) system. The disclosure could also be implemented, e.g., in connection with overlaying weather and/or other information onto aeronautical charts for display via aircraft multi-function display (MFD) systems and/or flight planning systems used prior to flight. It should be noted generally that various types of displays and/or display systems, aeronautical or otherwise, could be used in various implementations.

Figure 2:
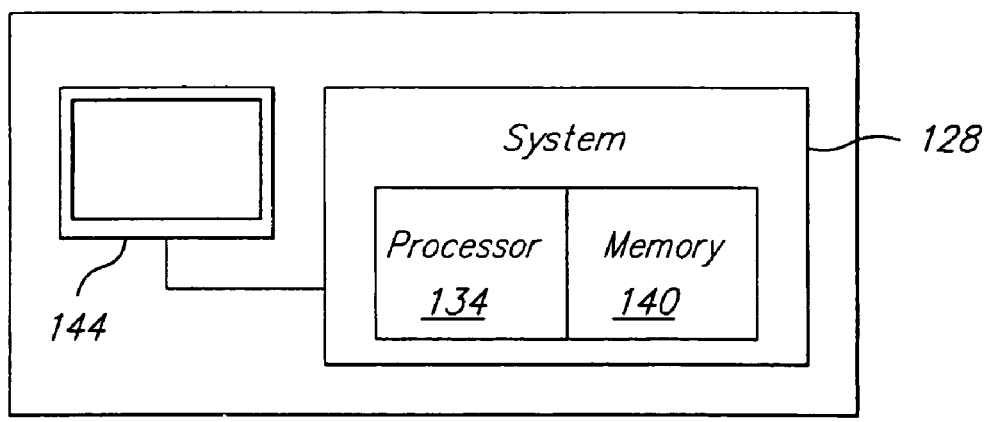
FIG. 2 is a block diagram of an environment in which a system for electronically displaying overlay information relative to chart data is used in accordance with one configuration of the present disclosure.

An environment in which a system for electronically displaying overlay information relative to chart data is used in accordance with one implementation of the disclosure is indicated generally in FIG. 2 by reference number 100. The environment 100 may be, e.g., an aircraft, a ground system for planning flights, and/or one of many other or additional environments. In the present exemplary implementation, the environment 100 is an aircraft. The aircraft 100 includes a system 128, which in the present example is an electronic flight box (EFB) system. In various other implementations, the system 128 could be, e.g., a multifunction display (MFD) system. The EFB system 128 may receive information from one or more aircraft systems, e.g., onboard geo-referencing equipment (e.g., Global Positioning System), for use in various applications. The EFB system 128 also may use one or more communications systems of the aircraft 100 to interface with a ground network. The EFB system 128 includes one or more processors 134, one or more memories 140, and one or more displays 144 (one each of which is shown in FIG. 2). The display(s) 144 may be flight-deck-mounted.

The pilot or other user of the EFB system 128 may wish to view weather information relative to an aeronautical chart. In accordance with one implementation of the disclosure, the processor 134 and memory 140 of the EFB system 128 are configured to display the aeronautical chart as one or more views on the display 144. Weather information can be of many different types, including but not limited to images representing NexRad radar, wind measurement, and cloud top measurement. An electronically displayed aeronautical chart view also typically includes various images, e.g., flight path, airport and runway descriptors useful to a flight crew during navigation. When weather information is overlaid onto an aeronautical chart view, a user can find it advantageous to "zoom in" and/or "zoom out" to view the information at various view scales. It is desirable to display the weather information at various view scales without obscuring the underlying aeronautical data.

The processor 134 and memory 140 are configured to determine a scale of a view of an underlying chart, determine a significance of at least part of the weather information, select a display transparency based on the determined scale and significance, and display at least part of the weather information over the view at the selected display transparency.

Generally, significance of information within a NexRad image varies with intensity of radar returns which indicate precipitation intensity detected by the radar. Areas of a NexRad image in which underlying chart data is likely to be obscured tend to represent regions of relatively low precipitation intensity, since such regions tend to cover considerably more area than regions of high-intensity precipitation. High-intensity areas, the most significant information in a NexRad image, typically cover a relatively small area of an underlying chart.

In the present exemplary implementation, transparency of the NexRad overlay is varied based on intensity of NexRad returns and based on magnification view scale. At relatively small scales (i.e., more zoomed out), little or no aeronautical data typically is displayed on a chart. Additionally, a pilot or other user may be likely to want to have a NexRad image emphasized to better visualize general precipitation patterns. Accordingly, in the present implementation, when zoomed out to a small scale, a NexRad overlay is displayed as more opaque than in larger-scale views.

Figure 3:
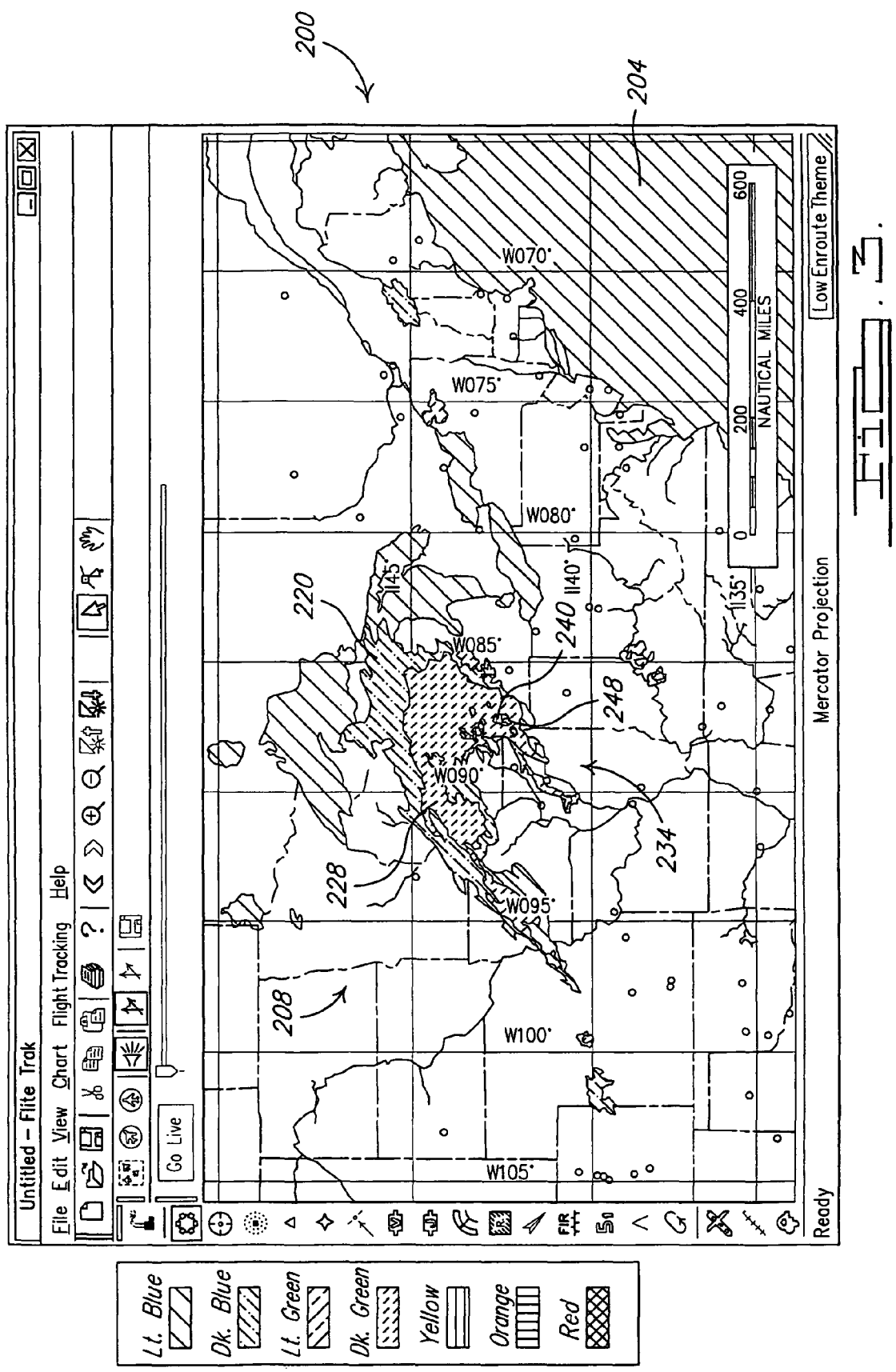

An exemplary view at a small scale (relative to scales shown in Figures that follow) is indicated generally in FIG. 3 by reference number 200. The view 200 is of a chart 204. Generally, when a user selects a view for display at a small scale, it is likely that the user wishes to view overall patterns, e.g., precipitation. Additionally, at a small scale, there typically is no aeronautical data sufficiently visible to clutter the view. More specifically, as shown in FIG. 3, a plurality of overlay items representing various areas and intensities of precipitation, indicated generally as 208, are overlaid onto the view 200. One of the items, an essentially opaque blue area 220, has a low significance, i.e., represents a low intensity of precipitation (with reference to an intensity scale not shown in FIG. 3). Another item 208, an essentially opaque green area 228, represents an intensity of precipitation higher than that represented by the area 220 and thus has a higher significance than that of the area 220. A clustering of overlay items indicated generally as 234 includes small essentially opaque yellow areas 240 and small essentially opaque red areas 248. The yellow areas 240 represent intensity of precipitation higher than the intensities represented by areas 220 and 228 and thus have a higher significance than those of areas 220 or 228. The red areas 248 represent the highest level of intensity of precipitation and thus have the highest significance.

Figure 4:
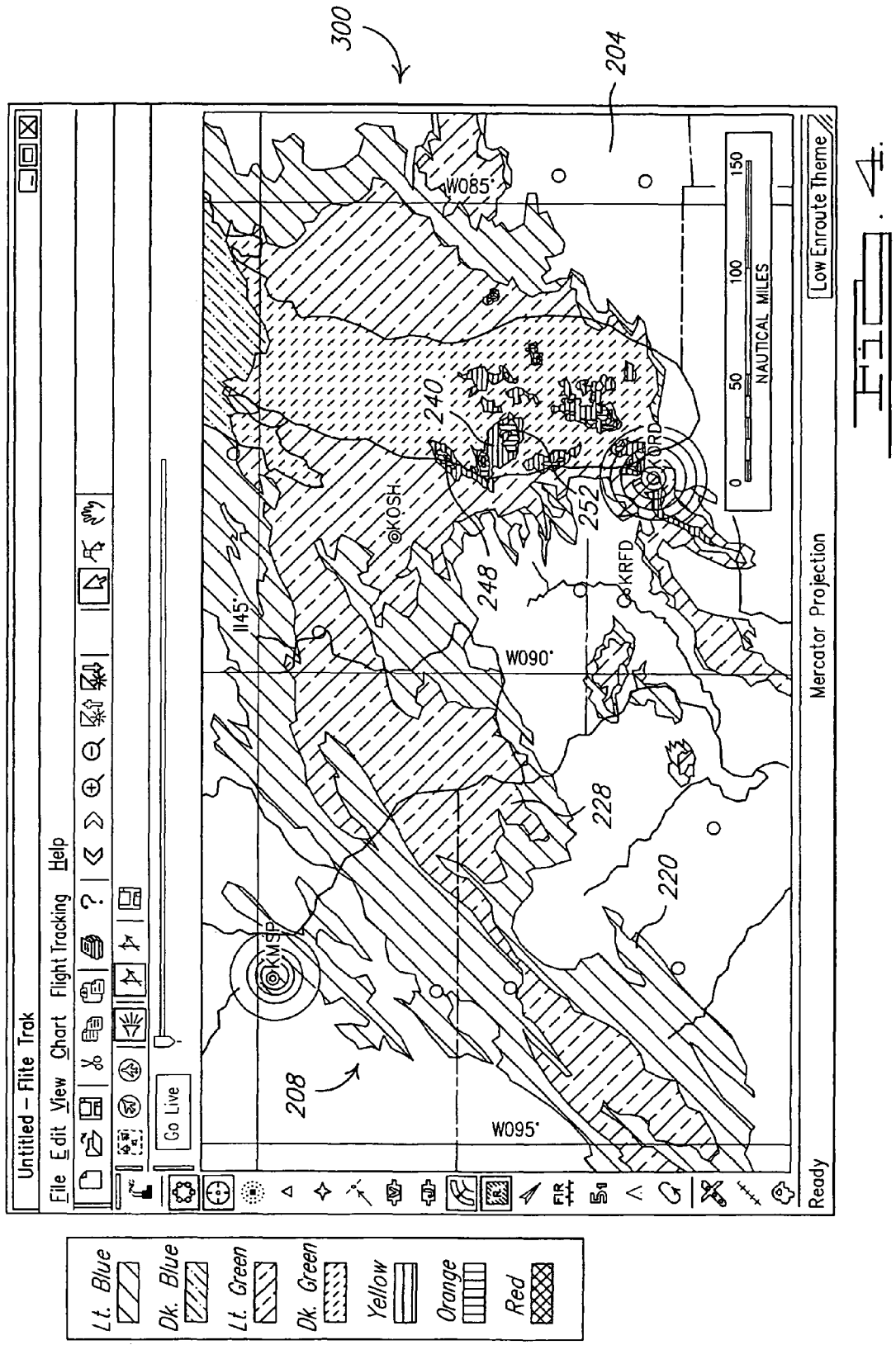
Figure 7:
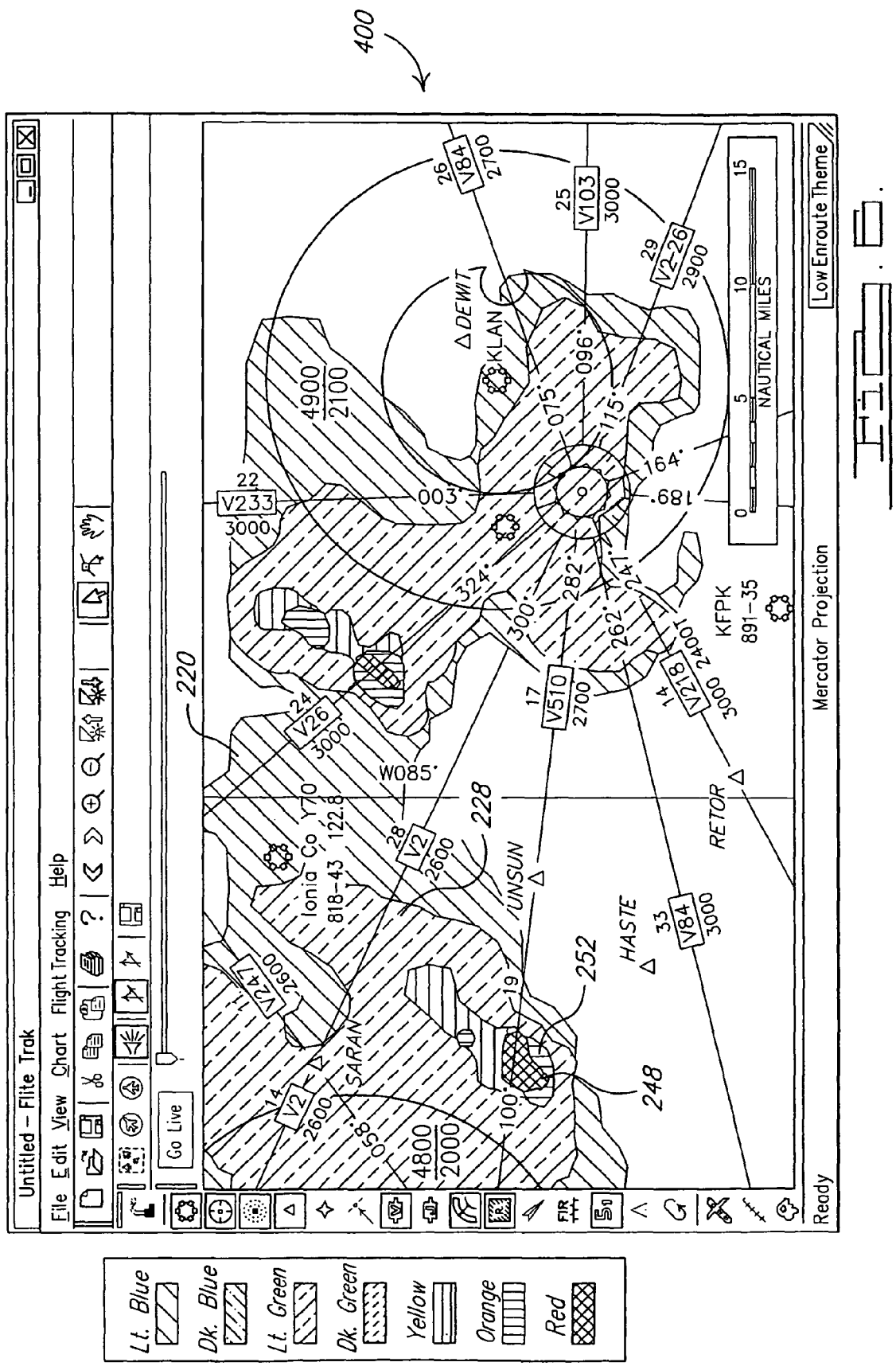

A view of the chart 204 at a scale larger than that of the view 200 is indicated generally in FIG. 4 by reference number 300. The overlay areas 220, 228 and 240 are visible in the view 300 and are more transparent than in the view 200. The increased transparencies allow the underlying chart 204 to show through the areas 220, 228 and 240 more distinctly than in the view 200. Overlay items 208 are more clearly delineated in the view 300 than in the view 200. For example, orange areas 252, which may be difficult to see in the view 200, are visible in the view 300. The orange areas 252 represent an intensity of precipitation higher than the intensity represented by yellow areas 240 but lower than the intensity represented by the red areas 248. The orange areas 252 thus have a significance higher than that of areas 240 and lower than that of the red areas 248.

A view at a scale larger than that of the view 300 is indicated generally in FIG. 5 by reference number 350. Blue areas 220 and green areas 228 are visible in the view 350 and are more transparent than in the views 200 and 300. The increased transparencies allow the underlying chart 204 to show through the areas 220 and 228 without degradation of visibility of images in the chart.

A view at a scale larger than that of the view 350 is indicated generally in FIG. 6 by reference number 400. Blue areas 220 and green areas 228 are visible in the view 400 and are more transparent than in the views 200, 300 and 350. The increased transparencies allow the underlying chart 204 to show through the areas 220 and 228 without degradation of visibility of images in the chart. Overlay items 208 representing high-intensity radar returns (e.g., thunderstorms), however, are not as transparent as the blue and green areas 220 and 228. The red areas 248, orange areas 252 and yellow areas 240 have higher degrees of opacity than the less significant areas 220 and 228. Because opacity is high for significant precipitation areas in large-scale views, it can be made obvious to a pilot or other user, e.g., where any intense precipitation areas are that need to be avoided. Because such precipitation areas typically are very small, underlying chart image degradation is limited or non-existent. Thus large areas of light precipitation are almost completely transparent in view 400, while smaller areas of higher precipitation (e.g., convective areas) are shown as essentially opaque so that they remain obvious to the pilot.

Thus the processor 134 and memory 140 are configured to facilitate user interaction with the display 144 by determining a scale of a current view, determining a significance of a given item of overlay information, and updating a display transparency for the overlay item, e.g., from a transparency for the item for a preceding view, based on the current view scale and item significance. Display transparency of a given overlay item may be increased and/or decreased over a plurality of views, depending, e.g., on view scale selected by the pilot or other user of the EFB system 128. It should be noted that the term "current view" may be used to refer to a view that is being configured, or is to be configured, with overlay information for display. The term "current view" may also be used to refer to a view currently being displayed.

Transparency values may be assigned, e.g., using alpha blending based on view scale and overlay item significance. It can be appreciated that many ways of assigning a transparency value to an item of overlay information are possible. Ranges of scale and/or significance could be used and varied in many ways relative to display transparency to provide various ranges and/or values of transparency for overlay information. For example, in some implementations, significance could be dependent on scale.

Methods and systems in accordance with the present disclosure make it possible for a pilot to view weather imagery overlaid on an electronically displayed map without having to switch back and forth between overlay and underlying map to see detail information when zooming in or out of the map. Displays in accordance with the disclosure can be intuitive and compelling. For example, when an overlay item having a color and some degree of transparency is overlaid onto colored chart data, the underlying chart color can be visible through the overlay item.

What is claimed is:

1. A processor-performed method of overlaying overlay information onto a view for electronic display, a given type of the information having a range of possible intensity values, the method comprising:
   providing a chart selectively displayable on the electronic display at first and second magnification view scales, wherein the first and second magnification view scales differ in magnification from one another;
   associating a given intensity value of the given type of information with first and second display transparency levels based on variance of significance of the given intensity value over the differing magnification view scales; the first and second display transparency levels representing differing levels of opacity;
   for a geographical area represented in the chart, determining a plurality of differing intensity values for the given type of information;
   displaying two different determined intensity values of the given type of information as an overlay on the chart, with the two different intensity values being displayed at the same associated display transparency level, and with the chart and the two intensity values being displayed at the first magnification view scale; and
   displaying the two different determined intensity values of the given type of information at the second magnification scale, and at the first and second display transparency levels.

2. The method of claim 1, further comprising associating the given intensity value with a single display transparency level based on a high significance of the given intensity value at each of the magnification view scales.

3. The method of claim 2, wherein the single associated display transparency level is a substantially opaque level.

4. The method of claim 1, further comprising associating the given intensity value with a plurality of differing display transparency levels in accordance with a varying significance of the given intensity value over the magnification view scales.

5. The method of claim 4, further comprising increasing a display transparency level of said given one of the determined intensity values as a magnification view scale increases over a plurality of views.

6. The method of claim 5, wherein the method is performed while keeping the same transparency level of a different one of the determined intensity values when different magnification view scales are used.

7. The method of claim 1, wherein the overlay information is navigation-related.

8. The method of claim 1, wherein the overlay information is weather-related, and displaying the two different determined intensity values comprises:
   displaying the two different determined intensity values for the given type of information at the first transparency level at the first magnification view scale; and
   over a plurality of views of increasing magnification view scale, increasing transparency levels for one of the two different determined intensity values to a higher transparency level.

9. A processor-implemented method of facilitating user interaction with a display on which information is displayable in one or more views and overlay information is overlayable on the one or more views, the information including a weather-related information category having a range of possible intensity values, the method comprising:
   providing a chart selectively displayable on the electronic display at a plurality of view scales;
   associating a given intensity value of the weather-related information category with first and second display transparency levels based on a severity associated with the intensity value;
   for a geographical area represented in the chart, determining a plurality of intensity values of the weather-related information category;
   displaying two different determined intensity values of the weather-related information category at a first magnification view scale at the same associated transparency level; and
   displaying the two different determined intensity values of the weather-related information category at a second magnification view scale that is greater than the first magnification view scale, and displaying the two different determined intensity values at different associated transparency levels.

10. The method of claim 9, wherein the display is on board an aircraft.

11. The method of claim 9, further comprising:
    determining a current magnification view scale of the chart; and
    reducing a display transparency from a value used for a previous view being displayed at one of the first and second magnification view scales, when the determined magnification view scale is smaller than the magnification view scale of the previous view.

12. The method of claim 9, wherein the overlay information includes first and second overlay items, each item having a different significance, the method further comprising updating display transparencies of the items to different values based on the significances.

13. The method of claim 12, further comprising increasing a transparency difference between the first overlay item and the second overlay item in accordance with an increase in magnification view scale between the current view and a previous view.

14. The method of claim 12, further comprising decreasing a transparency difference between the first overlay item and the second overlay item in accordance with a decrease in magnification view scale between the current view and a previous view.

15. A system for electronically displaying overlay information relative to chart data, the system comprising a processor and memory encoded with instructions executable by the processor to:

provide a chart selectively displayable on an electronic display at a plurality of differing magnification view scales;

associate a given intensity value of a type of weather-related information with a plurality of differing display transparency levels based on a severity associated with the intensity value;

for a geographical area represented in the chart, determine a plurality of intensity values of the weather-related information type;

display two different determined intensity values of the weather-related information type at a first magnification view scale simultaneously on the electronic display, and at a common transparency level associated with both of the two different determined intensity values; and display the two different determined intensity values of the weather-related information type simultaneously in a different view on the electronic display at a second magnification view scale at two different display transparency levels.

16. The system of claim 15, further comprising the processor being configured to display the view and the different view on the electronic display.

17. The system of claim 15, wherein configured to select a display transparency further comprises configured to update a display transparency for a preceding view.

18. The system of claim 15, wherein a significance represents an intensity.

19. The system of claim 15, wherein the processor and memory are further configured to select a plurality of display transparencies for a plurality of items of the overlay information based on different significances determined for the items.

20. The system of claim 19, wherein the processor and memory are further configured to display the plurality of items of the overlay information at the plurality of display transparencies over the view.

* * * * *